United States Patent
Maalioune

(10) Patent No.: US 8,285,467 B2
(45) Date of Patent: Oct. 9, 2012

(54) METHOD AND SYSTEM FOR CONTROLLING AT LEAST ONE ACTUATOR FOR ACTUATING THE COWLINGS OF A THRUST INVERTER IN A TURBOJET ENGINE

(75) Inventor: Hakim Maalioune, Orgeval (FR)

(73) Assignee: Aircelle (FR)

( * ) Notice: Subject to any disclaimer, the term of this patent is extended or adjusted under 35 U.S.C. 154(b) by 341 days.

(21) Appl. No.: 12/673,890

(22) PCT Filed: Jul. 16, 2008

(86) PCT No.: PCT/FR2008/001047
§ 371 (c)(1),
(2), (4) Date: Feb. 17, 2010

(87) PCT Pub. No.: WO2009/030837
PCT Pub. Date: Mar. 12, 2009

(65) Prior Publication Data
US 2010/0168982 A1 Jul. 1, 2010

(30) Foreign Application Priority Data
Aug. 20, 2007 (FR) ..................................... 07 05923

(51) Int. Cl.
*F02K 3/02* (2006.01)
*F02K 1/32* (2006.01)

(52) U.S. Cl. ...... 701/100; 244/110 B; 60/204; 60/226.2; 60/226.3; 60/230

(58) Field of Classification Search .................. 701/100; 60/204, 226.1–226.3, 230; 244/110 B
See application file for complete search history.

(56) References Cited

U.S. PATENT DOCUMENTS

| | | | |
|---|---|---|---|
| 4,543,783 A * | 10/1985 | Greune et al. | 60/226.2 |
| 4,827,248 A | 5/1989 | Crudden | |
| 6,519,929 B2 * | 2/2003 | Ahrendt | 60/226.2 |
| 6,681,559 B2 * | 1/2004 | Johnson | 60/204 |
| 6,926,234 B2 * | 8/2005 | Colotte et al. | 244/110 B |
| 7,946,106 B2 * | 5/2011 | Dehu et al. | 60/226.2 |
| 2002/0157376 A1 | 10/2002 | Ahrendt | |
| 2004/0139726 A1 * | 7/2004 | Colotte et al. | 60/226.2 |

FOREIGN PATENT DOCUMENTS

| | | |
|---|---|---|
| WO | 03010430 A1 | 2/2003 |
| WO | 2006134253 A1 | 12/2006 |

OTHER PUBLICATIONS

International Search Report PCT/FR2008/001047; Dated Mar. 17, 2009.

\* cited by examiner

*Primary Examiner* — Ruth Ilan
(74) *Attorney, Agent, or Firm* — Cantor Colburn LLP

(57) ABSTRACT

The invention relates to a method for controlling at least one actuator for actuating the cowlings of a thrust inverter in a turbojet engine, the actuator being driven by an electric motor including a relative position sensor providing information on the evolution of the movement thereof, wherein the motor is controlled based on the instantaneous position of the cowling in at least one portion of the movement thereof between an open position and a closed position, the instantaneous position of the cowling being determined from at least one reference position absolute data and relative position data relative to said reference position provided by the relative position sensor of the motor, wherein in case the actuation is resumed after an interruption, a new determination of the reference position is initiated.

9 Claims, 4 Drawing Sheets

METHOD AND SYSTEM FOR CONTROLLING AT LEAST ONE ACTUATOR FOR ACTUATING THE COWLINGS OF A THRUST INVERTER IN A TURBOJET ENGINE

TECHNICAL FIELD

The present invention relates to a method and a system for controlling at least one actuator for actuating cowlings of a thrust reverser for a turbojet engine.

BACKGROUND

The role of a thrust reverser when landing an airplane is to improve the braking capacity of an airplane by redirecting forward at least a portion of the thrust generated by the turbojet engine. In this phase, the reverser obstructs the gas exhaust nozzle and directs the exhaust flow from the engine toward the front of the nacelle, thus generating a counter-thrust that is added to the braking of the wheels of the airplane.

The means implemented to produce this reorientation of the flow vary according to the type of reverser. However, in all cases, the structure of a reverser comprises moving cowlings that can be moved between, on the one hand, a deployed position in which they open within the nacelle a passage intended for the deflected flow, and on the other hand, a retracted position in which they close this passage. These moving cowlings can also provide a deflection function or simply activate other deflection means.

In grid-type reversers, for example, the moving cowlings slide along rails so that when retracted in the opening phase, they uncover grids of deflection veins arranged in the thickness of the nacelle. A system of connecting rods links this moving cowling to locking doors that are deployed inside the exhaust duct and block the outlet in direct flow mode. In door-type reversers, on the other hand, each moving cowling pivots so as to block the flow and deflect it and is therefore active in this reorientation.

Generally, these moving cowlings are actuated by hydraulic or pneumatic actuating cylinders that require a network for transporting a fluid under pressure. This fluid under pressure is conventionally obtained either by tapping air from the turbojet engine in the case of a pneumatic system, or by sampling from the hydraulic circuit of the airplane. Such systems require significant maintenance because the slightest leak in the hydraulic or pneumatic network may be difficult to detect and risks having damaging consequences both on reversing and on other parts of the nacelle. Moreover, because of the reduced space available in the front frame of the reverser, the installation and protection of such a circuit are particularly difficult and bulky.

To overcome the various drawbacks associated with pneumatic and hydraulic systems, the manufacturers of thrust reversers have sought to replace them and equip their reversers as much as possible with electromechanical actuators that are lighter and more reliable. Such a reverser is described in the document EP 0 843 089.

By using such actuators, it is possible to produce a servo-control of the deployment and closure movements of a reverser cowling on the basis of the position of the cowling in its travel between its open position and its closed position.

To this end, it is known to use absolute position sensors arranged on the cowlings and/or the actuators, but also speed sensors mounted on the axis of the electric motor of the actuator, as is the case in the document WO 2006/134253.

In such conditions, in case of failure of these sensors, the movement of the cowling can no longer be controlled.

It is also known, notably from the document WO 03/010430, that when an interruption occurs in the retraction or deployment, for example in the event of a temporary outage of the electrical power supply followed by a restart, the cowling of the thrust reverser automatically returns to its reference position corresponding to its retracted position. It is therefore not possible to know exactly the position of the cowling until it has reached its retracted position.

BRIEF SUMMARY

The disclosure provides a control method that limits the cases of unavailability of the reverser.

To this end, the subject of the invention is a method of controlling at least one actuator for actuating cowlings of a thrust reverser for a turbojet engine, the actuator being driven by an electric motor including a relative position sensor supplying information on the evolution of its movement, wherein the control of the engine is servo-controlled based on the instantaneous position of the cowling in at least a portion of its travel between its open position and its closed position, the instantaneous position of the cowling being determined as a function of at least one reference position absolute datum and relative position data relative to said reference position supplied by the relative position sensor of the engine, and wherein, in case the actuation is resumed after an interruption, a new determination of the reference position is initiated.

Thanks to the arrangements according to the invention, the instantaneous position is calculated on the basis of a succession of relative position information from the relative sensor of the engine. The reference position information can be determined in a number of different ways, which makes it possible to reduce the dependence on the absolute position sensors and allow for improved operation after an interruption.

Advantageously, the reference position is determined as an extreme position of the travel of the cowling.

The extreme position of a cowling can be determined without an absolute position sensor for the cowling, for example by a proximity sensor.

According to one embodiment, the reference position is determined on the basis of at least one absolute position datum of the cowling supplied by an absolute position sensor of the cowling.

Advantageously, the reference position is calculated as an average of at least two absolute position values supplied by absolute position sensors of the cowling.

According to one implementation, the position values supplied by at least one absolute position sensor of the cowlings are compared to a range of values corresponding to the travel of the cowling.

According to one implementation, in case of failure to determine a reference position value, the control of the engine is modified to lower the torque and/or the speed of the engine.

These arrangements make the opening and closure of the reverser slower, but allow it to be used despite a sensor failure.

Actuation at low speed avoids damage to the structure in the absence of position information.

According to one implementation, the stop position is used to determine the reference position upon the resumption.

Advantageously, a relative position signal for the engine and the stop position are used to determine the new reference position.

Another subject of the present invention is a system for controlling at least one actuator for actuating cowlings of a thrust reverser for a turbojet engine, comprising:

at least one actuator for actuating a cowling driven by at least one electric motor, and means of controlling the actuator and the electric motor, the electric motor including a relative position sensor supplying information on the evolution of its movement, wherein the control means are arranged to perform the steps of the method as described previously.

BRIEF DESCRIPTION OF THE DRAWINGS

In any case, the invention will be clearly understood with the help of the following description, with reference to the appended diagrammatic drawing that represents, by way of nonlimiting example, one embodiment of the system implementing a method according to the invention.

DETAILED DESCRIPTION

Before giving a detailed description of one embodiment of the invention, it is important to specify that the method and the system described are not limited to a particular type of reverser. Although illustrated by a grid-type reverser, the invention can also be implemented with reversers of different designs, notably door-type.

Figure 1:
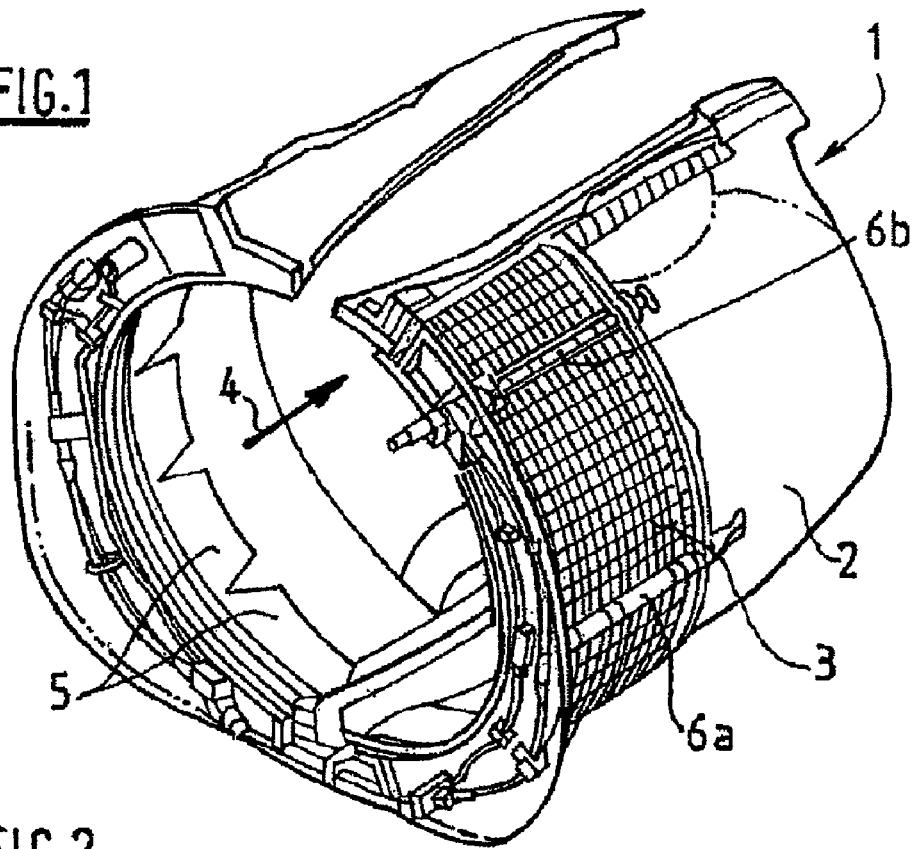
FIG. 1 is a partial diagrammatic perspective view of a nacelle incorporating a grid-type thrust reverser.

FIG. 1 shows a partial diagrammatic view of a nacelle incorporating a thrust reverser 1. The turbojet engine is not represented. This thrust reverser 1 has a structure comprising two semicircular moving cowlings 2 that can slide to uncover grids 3 of deflection veins placed between the moving cowlings 2 and a section for passage of the airflow to be deflected. Blocking doors 5 are positioned inside the structure so as to be able to pivot and switch from a position in which they do not hamper the passage of the airflow 4 to a position in which they block this passage. In order to coordinate the opening of the moving cowlings 2 with a blanking position of the blocking doors 5, the latter are mechanically linked to the moving cowling 2 by hinges and to the fixed structure by a system of connecting rods (not represented).

The movement of the moving cowlings 2 along the outside of the structure is handled by a set of actuating cylinders 6a, 6b mounted on a front frame inside which are housed an electric motor 7 and flexible transmission shafts 8a, 8b respectively connected to the actuating cylinders 6a, 6b to actuate them.

Figure 2:
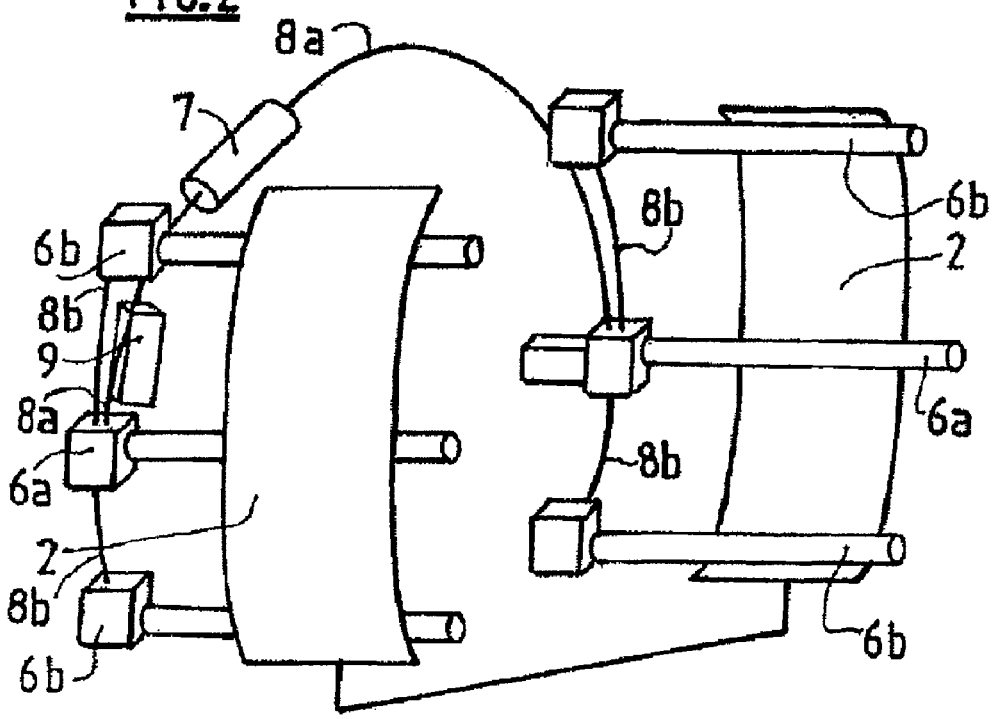
FIG. 2 is a diagrammatic representation of the moving cowlings and their actuation system.

The actuation system for the moving cowlings 2 is represented on its own in FIG. 2. Each moving cowling 2 can be translated under the action of three actuating cylinders 6a, 6b, comprising a central actuating cylinder 6a and two additional actuating cylinders 6b, actuated by a single electric motor 7 linked to control means 9, including a microcontroller. The power delivered by the electric motor 7 is first distributed to the central actuating cylinders 6a via two flexible transmission shafts 8a, then to the additional actuating cylinders 6b by flexible transmission shafts 8b.

According to a variant that is not represented, only two up-and-down actuating cylinders are used for each cowling, actuated by a single electric motor linked to a control interface. The power delivered by the electric motor is delivered to the two up-and-down actuating cylinders via two flexible transmission shafts 8a.

Figure 3:
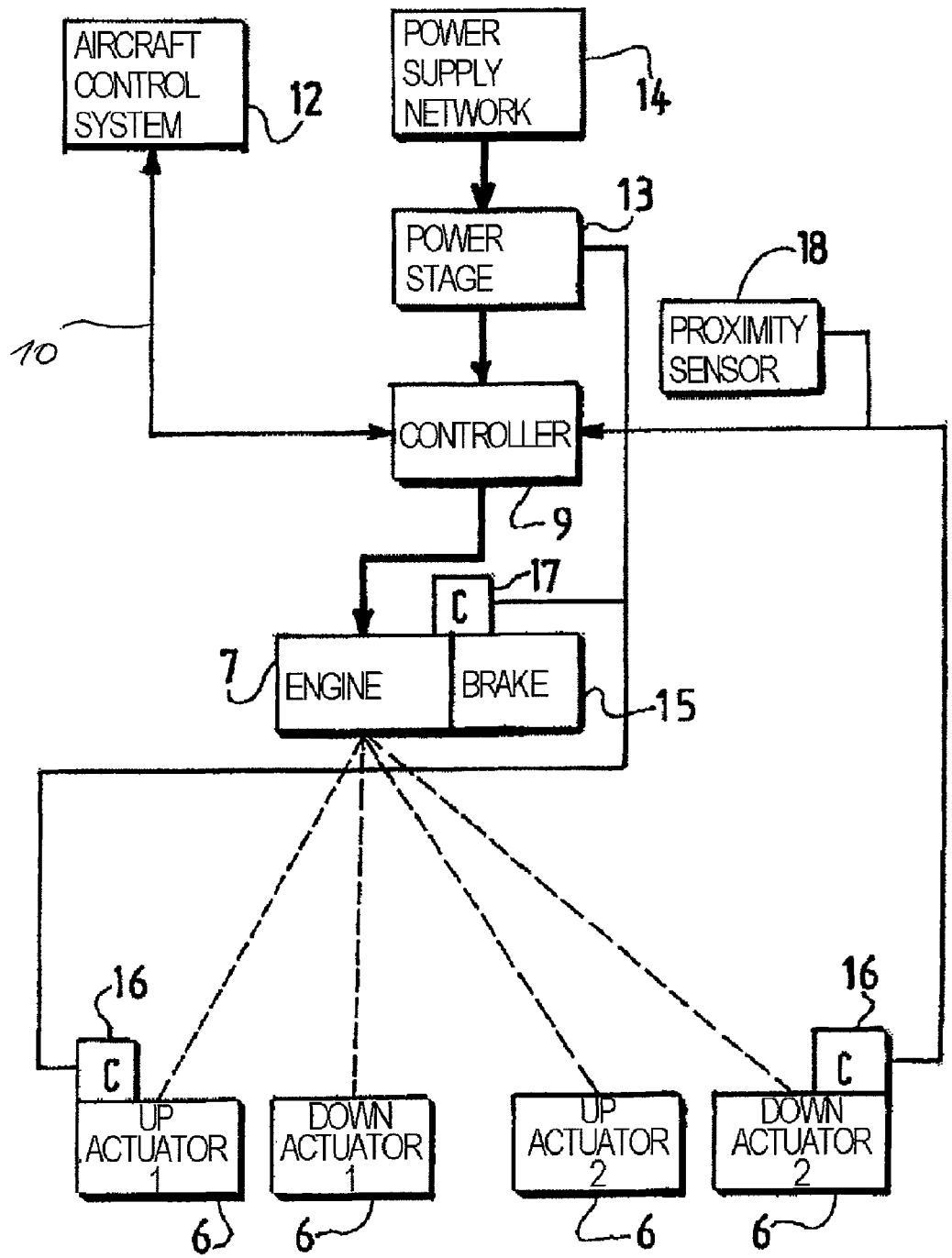
FIG. 3 is a diagrammatic representation of the control system for the actuators of the moving cowlings.

FIG. 3 diagrammatically shows a control system for actuating two cowlings with, for each cowling, two actuators, up and down.

As represented in FIG. 3, a control system for the actuators of a thrust reverser according to the invention includes control means comprising a microcontroller 9.

This microcontroller is linked by communication means 10 to the control system 12 of the aircraft.

The control system also includes a power stage 13 linked to the power supply network 14 of the aircraft.

The microcontroller 9 makes it possible to control an electric motor 7 and actuating cylinders or actuators 6 as described previously. The motor also includes a brake 15 which is also controlled by the microcontroller 9.

The system also comprises absolute position sensors 16 that make it possible to know the movement of the cowling 2 between the open and closed positions. These position sensors 16 can be placed on the cowling 2 or on the actuator 6.

The electric motor 7 includes a relative position sensor 17 supplying information on the trend of the movement of the moving part of the motor.

The system also includes proximity sensors 18 that make it possible to independently identify absolute position sensors 16 if the cowling is in the open or closed position.

These sensors are linked directly to the controller 9 in the embodiment represented. According to a variant, these sensors are linked to the control system of the aircraft which transmits the signal from this sensor to the controller 9.

The control means 9 are arranged to servocontrol the control of the motor 7 on the basis of the position of the cowling 2 in its travel between its open position and its closed position.

To produce this servocontrol, the control means 9 are arranged to determine the instantaneous position Pi of the cowling 2 on the basis of a reference position absolute datum Pref and an integration or a summation of the relative position data δPref supplied by the relative position sensor of the motor from this reference position Pref to the instantaneous position, which can be described by the following formula:

$$P_i = P_{ref} + \int \delta P_{rel}$$

The reference position must be determined when the absolute position sensors 16 are available, but also in cases where the latter are not available.

Figure 4:
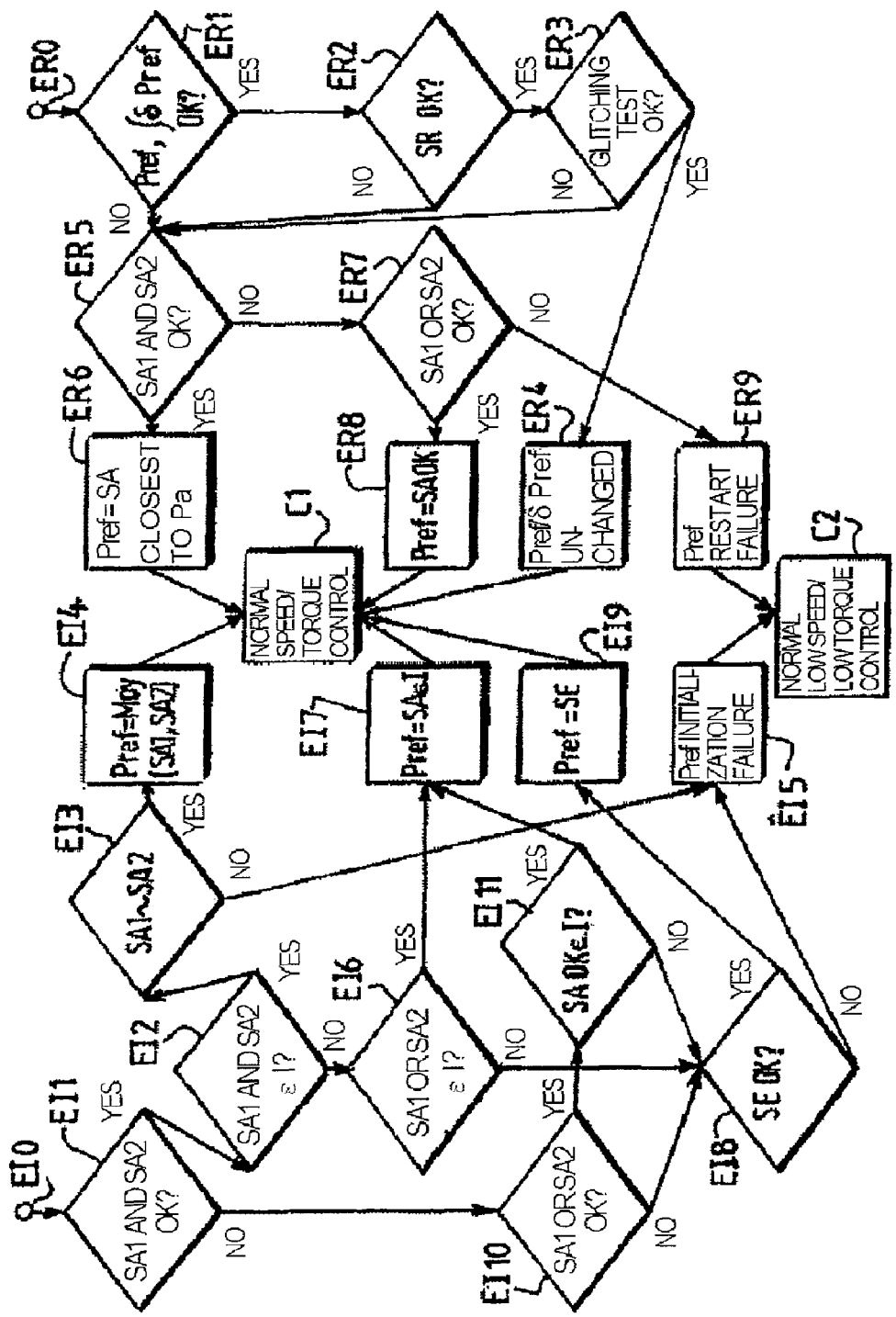
FIG. 4 is a flow diagram of a method according to the invention.

FIG. 4 illustrates the method making it possible to determine the reference position Pref. This position must be determined when an operation to actuate the cowlings of the reverser is initiated by a user. This reference position Pref must also be restored upon an interruption of an actuation operation followed by a resumption of this operation. This type of interruption and resumption may occur, for example, in the event of a temporary electrical power supply outage.

In these two distinct situations, the method follows a set of steps to determine a usable reference position Pref.

Figure 5:
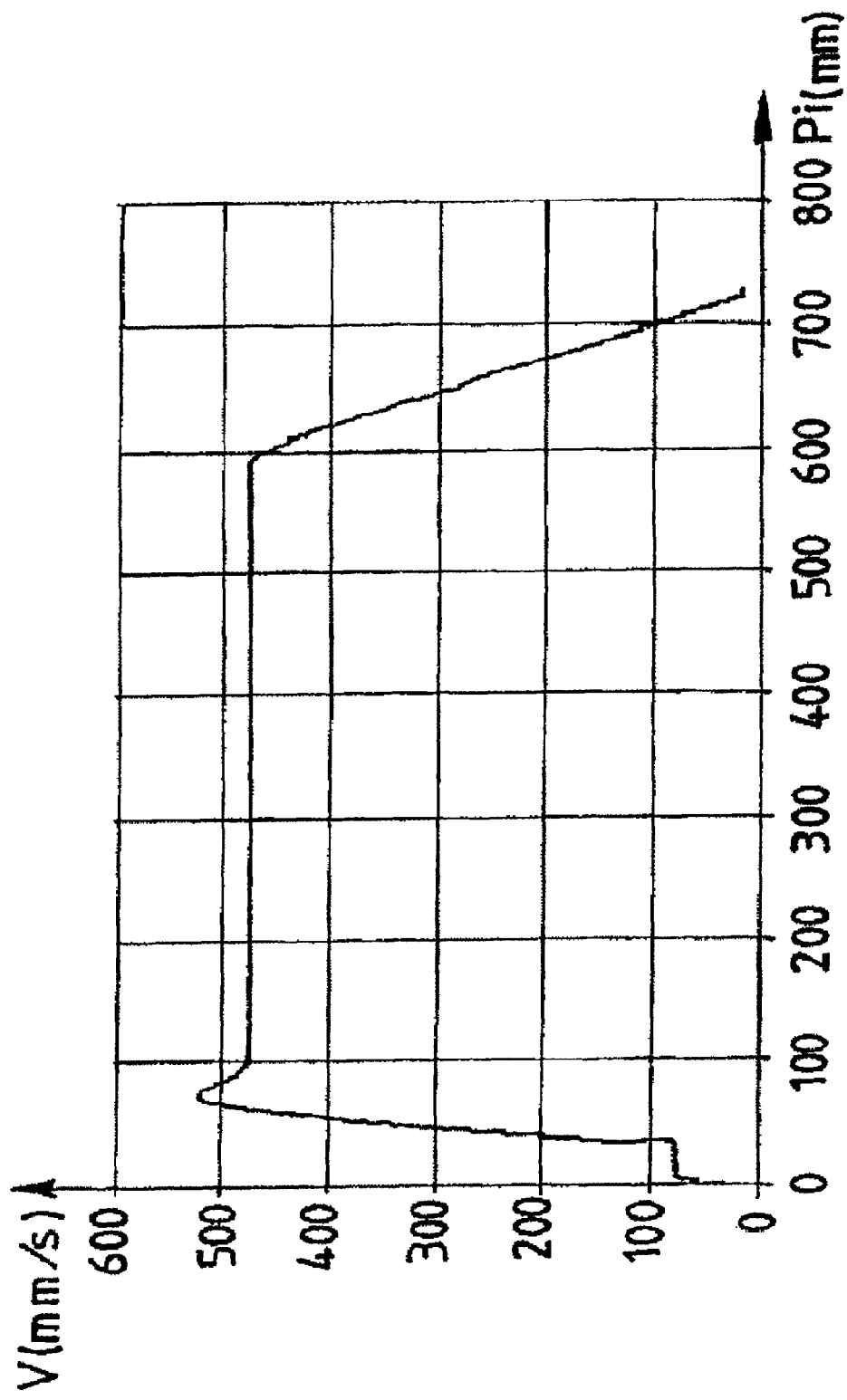
FIG. 5 gives an example of the trend of the speed of a cowling on the basis of its position during a deployment phase.

In the case where a reference position Pref can be determined, a normal-speed control is effected, by using, for example, the speed servocontrol curve V as a function of the instantaneous position Pi in the travel illustrated in FIG. 5. It should be noted that the torque of the motor is also servocontrolled on the basis of the position.

In the case where the reference position Pref cannot be determined, the system does not have reliable information on the position of the cowling and an actuation control C2 at low speed and/or low torque is applied. This arrangement makes the opening and closure of the reverser slower, but allows it to be used despite the absence of position information.

The low-speed actuation avoids damage to the structure in the absence of position information. The end of the travel of the cowling can be detected by a rise in the motor torque and/or a rise in the motor current, or even by the reception of a signal originating from a proximity sensor.

As represented in FIG. 4, the initialization of the instantaneous position Pi with a reference position Pref is performed from a starting point EI0 in a deployment or opening operation upon receipt of an instruction from a user.

In a first step EI1, the conformity of the signals SA1 and SA2 received from the absolute position sensors 16 is checked. A "conforming signal" should be understood here to mean an available signal that corresponds to usable position information.

If the signals originating from these two sensors 16 do conform, a second step EI2 is carried out.

The second step EI2 includes checking whether the two signals SA1 and SA2 from the sensors 16 are contained within a range of values I corresponding to the travel of the cowling 2, this set of values possibly being augmented by a tolerance. For example, on a travel of the order of 730 mm, a tolerance of 10 mm may be provided, which leads to a range of values between −10 and +740 mm.

In the case where the two signals SA1 and SA2 are contained within the range I, a third step EI3 is carried out.

The third step EI3 comprises checking whether the signals SA1 and SA2 originating from the sensors are in agreement, that is to say whether their values are close to one another, by comparison with a predetermined acceptable difference threshold.

In the case where the two signals SA1 and SA2 are close, a fourth step EI4 is carried out.

The fourth step EI4 comprises an initialization of the instantaneous position Pi of the engine to a reference value Pref corresponding to the average of the values of the signals SA1 and SA2 from the absolute position sensors 16.

Once this fourth step EI4 is completed, the control C1 at normal speed of the actuation of the cowling is carried out, by calculating the instantaneous position Pi of the cowling on the basis of a reference position absolute datum Pref and an integration of the relative position data Prel supplied by the relative position sensors 17 of the motor on the basis of this reference position Pref.

This first sequence of steps between EI0 and C1 corresponds to a nominal usage case in which the values SA1 and SA2 of the two absolute position sensors 16 are available and usable.

In the case where the test on the agreement of the value in the step 3 indicates that the values are not close, a fifth step E5 is carried out.

The fifth step E5 corresponds to a determination of the failure to initialize the initial position Pi.

In these conditions, a low-speed control C2 is required.

In the case where the test of the second step EI2 indicates that the two signal values SA1 and SA2 from the absolute sensors 16 are not within the range I, a sixth step EI6 is carried out.

The sixth step EI6 comprising checking whether at least one of the signals SA1 and SA2 originating from an absolute sensor 16 is contained within the range I.

In the case where one of the absolute sensor signals 16 is actually within the range I, a seventh step EI7 is carried out.

The seventh step EI7 comprises initializing the instantaneous position Pi of the motor to a reference value Pref corresponding to the signal value SA from the absolute position sensor 16 situated within the range I.

Once this seventh step EI7 is completed, the control C1 at normal speed of the actuation of the cowling is carried out by using the newly determined reference value Pref.

In the case where the test of the sixth step EI6 indicates that none of the signal values SA1 and SA2 from the absolute sensors 16 is situated within the range I, an eighth step EI8 is carried out.

The eighth step EI8 comprises checking for the existence of a signal SE, originating for example from a proximity sensor 19, indicating that the cowlings 2 are at one of the ends of their travel, for example abutting in the open or closed position.

If such abutted position information Pb is available, a ninth step E9 is carried out.

The ninth step EI9 comprises initializing the instantaneous position Pi of the motor to a reference value Pref corresponding to the end position detected SE.

Once this ninth step EI9 is completed, the control C1 at normal speed of the actuation of the cowling 2 is carried out by using the duly determined reference value Pref.

In the case where the test of the first step EI1 indicates that the signals SA1 and SA2 from the two absolute sensors 16 do not conform, a tenth step EI10 is carried out.

The tenth step EI10 comprises checking whether at least one signal SA1 and SA2 from an absolute position sensor 16 conforms.

In the case where the test of the second step EI10 indicates that the signal SA from an absolute sensor 16 conforms, an eleventh step EI11 is carried out.

The eleventh step EI11 comprises checking whether the value SA of the signal originating from an absolute sensor 16 is contained within the range I.

In the case where the signal SA from the absolute sensor 16 actually lies within the range I, the seventh step EI7 is carried out as described previously, followed by the control C1 at normal speed of the actuation of the cowling 2 by using the duly determined reference value Pref.

In the case where the test of the step EI11 indicates that the signal SA from the absolute position sensor 16 is not within the range I, step EI8 is carried out as described previously, along with the following steps.

In the case where the test of the step EI10 indicates that the signal from the absolute position sensor 16 does not conform, the step EI8 is carried out as described previously, as are the subsequent steps.

The steps of the method described hereinabove correspond to an initialization and to a control of the actuation based on the receipt of an actuation control instruction.

In the case where the actuation operation is interrupted during the deployment, the actuation is resumed according to the steps described hereinbelow from the start point ER0.

The first step ER1 comprises checking whether the values of the variables consisting of the initial position Pref on the one hand and the integration of the relative position data from the sensor $\int \delta P_{rel}$ on the other hand are still valid in relation to the state of the system. It is, for example, possible to consider that, after a certain interruption time, these values are no longer valid.

In the case where the value of the variables hereinabove is considered to be valid, a recalculation of a new value of Pref is a priori not necessary.

Advantageously however, two complementary test steps ER2 and ER3 are carried out.

The second step ER2 comprises identifying whether the value of the relative position signal SR supplied by the motor position sensor of the motor which supplies the relative position data $\delta P_{rel}$ is compatible with the values of the variables Pref and $\int \delta P_{rel}$ that the controller 9 has.

The third step ER3 comprises checking that the signal SR does not include aberrant values originating from the absolute position sensor, corresponding to the signal peaks phenomenon, also called glitching.

If the tests of the two steps ER2 and ER3 are positive, a fourth step ER4 is carried out.

The fourth step ER4 comprises resuming the actuation by using values of Pref and $\int \delta P_{rel}$ preexisting before the interruption.

This corresponds to a situation in which the cowling has not been moved relative to its stop position Pa before the interruption.

The control C1 at normal speed of the actuation of the cowling 2 is carried out by using the duly determined values of Pref and $\int \delta P_{rel}$.

According to a variant, it would be possible in this situation to reuse the value Pa as the new reference value and recommence integrating the relative position values.

In the case where the tests of the first three steps ER1, ER2 and ER3 are negative, a series of steps is carried out from a fifth step ER5 in order to determine a new reference position Pref from which a new integration of the relative position values will be carried out.

The fifth step ER5 comprises checking the conformity of the signals SA1 and SA2 received from the absolute position sensors 16.

If the signals SA1 and SA2 originating from these two sensors 16 do conform, a sixth step ER6 is carried out.

The sixth step ER6 comprises using the position value SA supplied by the absolute sensor that is the closest to the position Pa upon the interruption to resume the actuation movement followed by the control C1 at normal speed of the actuation of the cowling 2 by using the duly determined reference value Pref.

In the case where the test of the fifth step ER5 indicates that the signals SA1 and SA2 from the two absolute sensors 16 do not conform, a seventh step ER7 is carried out.

The seventh step ER7 comprises checking whether at least one signal SA from an absolute position sensor 16 conforms.

In the case where the test of the seventh step ER7 indicates that a signal SA from an absolute sensor 16 does conform, an eighth step ER8 is carried out.

The eighth step ER8 comprises using the position value SA supplied by the conforming absolute sensor to resume the actuation movement, followed by the control C1 at normal speed of the actuation of the cowling 2 by using the duly determined reference value.

In the case where the test of the seventh step ER7 indicates that no signal SA1, SA2 from an absolute sensor 16 conforms, a ninth step ER9 is carried out.

The step ER9 comprises determining the fact that no valid position information is available.

In these conditions, a low-speed control C2 is required.

It should be noted that the control method described hereinabove can be programmed by software means on the computer.

It goes without saying that the invention is not limited to the single embodiment of the system, described hereinabove by way of example, but on the contrary encompasses all the variants.

The invention claimed is:

1. A method of controlling at least one actuator for actuating a cowling of a thrust reverser for a turbojet engine, the actuator being driven by an electric motor including a relative position sensor supplying information on the evolution of its movement,
   wherein the control of the motor is servo-controlled based on the instantaneous position of the cowling in at least a portion of its travel between its open position and its closed position, the instantaneous position of the cowling being determined as a function of at least one reference position absolute datum and relative position data relative to said reference position supplied by the relative position sensor of the motor,
   wherein, in case the actuation is resumed after an interruption, a new determination of the reference position is initiated before the actuation is resumed.

2. The method as claimed in claim 1, wherein the reference position or the new reference position is determined as an extreme position of the travel of the cowling.

3. The method as claimed in claim 1, wherein the reference position or the new reference position is determined on the basis of at least one absolute position datum of the cowling supplied by an absolute position sensor of the cowling.

4. The method as claimed in claim 1, wherein the reference position or the new reference position is calculated as an average of at least two absolute position values supplied by absolute position sensors of the cowling.

5. The method as claimed in claim 1, wherein position values supplied by at least one absolute position sensor of the cowlings are compared to a range of values corresponding to the travel of the cowling.

6. The method as claimed in claim 1, wherein, in case of failure to determine a reference position or a new reference position value, the control of the engine is modified to lower the torque and/or the speed of the engine.

7. The method as claimed in claim 1, wherein the stop position is used to determine the new reference position upon the actuation being resumed.

8. The method as claimed in claim 7, wherein a relative position signal for the engine and the stop position are used to determine the new reference position.

9. A system for controlling at least one actuator for actuating cowlings of a thrust reverser for a turbojet engine, comprising:
   at least one actuator for actuating a cowling driven by at least one electric motor, and
   means of controlling the actuator and the electric motor, the electric motor including a relative position sensor supplying information on evolution of its movement,
   wherein the control means are arranged to perform the method as claimed in claim 1.

* * * * *